US012803342B2

(12) United States Patent
Ash

(10) Patent No.: US 12,803,342 B2
(45) **Date of Patent: *Nov. 17, 2026**

(54) RADIAL FLUX ELECTRICAL MACHINES

(71) Applicant: Ashwoods Electric Motors Limited, Chudleigh (GB)

(72) Inventor: Lloyd Ash, Exeter (GB)

(73) Assignee: ASHWOODS ELECTRIC MOTORS LIMITED, Chudleigh (GB)

( * ) Notice: Subject to any disclaimer, the term of this patent is extended or adjusted under 35 U.S.C. 154(b) by 139 days.

This patent is subject to a terminal disclaimer.

(21) Appl. No.: 19/011,009

(22) Filed: Jan. 6, 2025

(65) Prior Publication Data

US 2025/0141280 A1 May 1, 2025

Related U.S. Application Data

(60) Continuation of application No. 18/460,421, filed on Sep. 1, 2023, now Pat. No. 12,289,014, which is a (Continued)

(30) Foreign Application Priority Data

Dec. 3, 2014 (GB) ...................................... 1421446

(51) Int. Cl.

*H02K 1/14* (2006.01)
*H02K 1/276* (2022.01)

(Continued)

(52) U.S. Cl.

CPC ............. *H02K 1/148* (2013.01); *H02K 1/276* (2013.01); *H02K 5/163* (2013.01); *H02K 7/006* (2013.01);

(Continued)

(58) Field of Classification Search

CPC ........ H02K 1/148; H02K 1/276; H02K 11/21; H02K 11/215; H02K 11/25; H02K 5/163;

(Continued)

(56) References Cited

U.S. PATENT DOCUMENTS 5,637,940 A 6/1997 Nagai et al.
6,880,229 B2 4/2005 Zepp et al.

(Continued)

FOREIGN PATENT DOCUMENTS

DE 19512080 A1 10/1995
EP 0803962 A1 10/1997

(Continued)

*Primary Examiner* — Sean Gugger

(74) *Attorney, Agent, or Firm* — McCoy Russell LLP

(57) ABSTRACT

A radial flux electrical machine is disclosed. The machine comprises a body of the stator having a body that defines a longitudinal axis a substantially cylindrical inner surface and an inner volume, and having a plurality of electromagnetic elements, each of which includes a stator core and a winding of electrically conductive material located around at least part of the stator core of the electromagnetic element, the electromagnetic elements being arranged around the inner surface of the stator, and operable to induce a magnetic flux field in a radial direction in the inner volume of the stator, and a rotor located within the inner volume of the stator, and rotatable with respect to the stator.

20 Claims, 5 Drawing Sheets

Related U.S. Application Data continuation of application No. 17/345,993, filed on Jun. 11, 2021, now Pat. No. 11,870,301, which is a division of application No. 15/532,889, filed as application No. PCT/GB2015/053429 on Nov. 12, 2015, now Pat. No. 11,063,481.

(51) Int. Cl.

| | |
|---|---|
| ***H02K 5/16*** | (2006.01) |
| ***H02K 7/00*** | (2006.01) |
| ***H02K 7/14*** | (2006.01) |
| ***H02K 11/21*** | (2016.01) |
| ***H02K 11/215*** | (2016.01) |
| ***H02K 11/25*** | (2016.01) |
| ***H02K 15/022*** | (2025.01) |
| ***H02K 15/03*** | (2006.01) |

(52) U.S. Cl.
CPC ............... *H02K 7/14* (2013.01); *H02K 11/21* (2016.01); *H02K 11/215* (2016.01); *H02K 11/25* (2016.01); *H02K 15/022* (2013.01); *H02K 15/03* (2013.01)

(58) Field of Classification Search
CPC ........ H02K 7/006; H02K 7/14; H02K 15/022; H02K 15/03
See application file for complete search history.

(56) References Cited

U.S. PATENT DOCUMENTS

| | | | | |
|---|---|---|---|---|
| 2007/0080592 | A1 | 4/2007 | Ohta et al. | |
| 2008/0061653 | A1 | 3/2008 | Sagara et al. | |
| 2008/0246359 | A1 | 10/2008 | Lee et al. | |
| 2009/0134832 | A1 | 5/2009 | Knauff | |
| 2010/0117465 | A1 | 5/2010 | Kamiya et al. | |
| 2013/0061640 | A1 | 3/2013 | Kim et al. | |
| 2013/0106214 | A1 | 5/2013 | Chang | |
| 2016/0036281 | A1 | 2/2016 | Nakano et al. | |
| 2017/0366053 | A1* | 12/2017 | Ash ........................ | H02K 1/148 |
| 2019/0097509 | A1* | 3/2019 | Oguchi .................. | H02K 1/276 |

FOREIGN PATENT DOCUMENTS

| | | | |
|---|---|---|---|
| JP | 2007259609 | A | 10/2007 |
| SU | 63316 | A1 | 11/1978 |
| WO | 2014041313 | A1 | 3/2014 |
| WO | 2014048243 | A1 | 4/2014 |

* cited by examiner

RADIAL FLUX ELECTRICAL MACHINES

CROSS-REFERENCE TO RELATED APPLICATIONS

The present application is a continuation of U.S. Non-Provisional patent application Ser. No. 18/460,421, entitled "RADIAL FLUX ELECTRICAL MACHINES", and filed on Sep. 1, 2023. U.S. Non-Provisional patent application Ser. No. 18/460,421 is a continuation of U.S. Non-Provisional patent application Ser. No. 17/345,993, entitled "RADIAL FLUX ELECTRICAL MACHINES", and filed on Jun. 11, 2021. U.S. Non-Provisional patent application Ser. No. 17/345,993 is a divisional of U.S. patent application Ser. No. 15/532,889, entitled "RADIAL FLUX ELECTRICAL MACHINES," and filed on Jun. 2, 2017. U.S. patent application Ser. No. 15/532,889 is a national phase of International Patent Application No. PCT/GB2015/053429, entitled "RADIAL FLUX ELECTRICAL MACHINES," and filed on Nov. 12, 2015. International Patent Application No. PCT/GB2015/053429 claims priority to Great Britain Patent Application No. 1421446.4, entitled "RADIAL FLUX ELECTRICAL MACHINES," and filed on Dec. 3, 2014. The entire contents of each of the above-listed applications are hereby incorporated by reference for all purposes.

FIELD OF THE DISCLOSURE

The present disclosure relates to radial flux electrical machines in which magnetic flux is induced in a radial direction between a stator and a rotor mounted for rotation within the stator.

BACKGROUND TO THE DISCLOSURE

Conventional radial flux electrical machines comprise a body of the stator having a plurality stator cores arranged around an inner surface of the stator, and defining a volume within the stator. Electrically conductive coils are arranged around respective stator cores, and operate to generate a magnetic flux in a radial direction within the stator. A cylindrical rotor, which may include a plurality of permanent magnets, is arranged inside the internal volume of the stator for rotation with respect to the stator. An air gap is defined between the rotor and the stator. In use, the rotor interacts with the magnetic flux field generated by passing electrical current through the stator coils, thereby producing a force, which causes the rotor to rotate with respect to the stator.

Existing radial flux electrical machines include a driveshaft on which the rotor is mounted inside a stator assembly. The driveshaft is supported at each end thereof by bearings located in the stator housing. One advantage of such a design is that it results in a self-contained electrical machine. However, such a design is difficult, and hence expensive, to manufacture and maintain.

In addition, typical radial flux electrical machine in controlled in dependence upon various measured parameters, particularly rotational speed and coil temperature. Existing design of radial flux machine employ complex arrangements for the provision of speed encoders, temperature sensors and control electronics. As such, manufacture and maintenance of existing designs can be complex and problematic.

Embodiments of the present disclosure seek to address the problems of the existing designs.

SUMMARY OF THE DISCLOSURE

According to one aspect of the present disclosure, there is provided a radial flux electrical machine comprising a drivetrain component having a housing and a driveshaft which extends out of the housing and which is supported for rotation with respect to the housing only by bearing means within the housing, a stator having a body that defines a longitudinal axis a substantially cylindrical inner surface and an inner volume, and having a plurality of electromagnetic elements, each of which includes a stator core of ferromagnetic material and a winding of electrically conductive material located around at least part of the stator core of the electromagnetic element, the electromagnetic elements being arranged around the inner surface of the stator, and operable to induce a magnetic flux field in a radial direction in the inner volume of the stator, the body of the stator being attached to the housing of the drivetrain component, such that the driveshaft of the drivetrain component extends into the inner volume, a rotor attached to the driveshaft and located within the inner volume of the stator, the rotor being rotatable with respect to the housing of the driveshaft component and stator, the rotor being supported for rotation with respect to the stator only by the bearing means of the housing of the drivetrain component, and an enclosure located to a first side of the body of the stator, arranged to close substantially that first side of the stator.

One example of such an electrical machine further comprises an encoder locating member having a first portion attached to, and rotatable with, an end portion of the driveshaft, a bearing mounted on the first portion, a second portion located on the bearing, such that the first portion is rotatable about the bearing with respect to the second portion, wherein the first portion is adapted for reception of a magnetic encoder element, and the second portion is adapted for reception of encoder circuitry including a magnetic sensor operable to interact with a magnetic encoder element received in the first portion, the first and second portions being arranged to define a predetermined air gap between such a magnetic encoder element and such a sensor.

One example of such an electrical machine further comprises a magnetic encoder element located in the first portion, and encoder circuitry located in the second portion.

The encoder circuitry may include control circuitry operable to control the machine. The control circuitry may include a touch-free temperature sensor operable to measure an operating temperature of at least one of the rotor and the windings of the stator.

In one example of such a radial flux electrical machine the stator may have a body that defines a longitudinal axis a substantially cylindrical inner surface and an inner volume, and having a plurality of electromagnetic elements, each of which includes a stator core of ferromagnetic material and a winding of electrically conductive material located around at least part of the stator core of the electromagnetic element, the electromagnetic elements being arranged around the inner surface of the stator, and operable to induce a magnetic flux field in a radial direction in the inner volume of the stator, and a rotor located within the inner volume of the stator, and rotatable with respect to the stator, wherein the inner surface of the body of the stator and the electromagnetic elements of the stator define cooperating engagement features of shape that serve to prevent relative rotation between the body of the stator and the electromagnetic elements, and which allow relative longitudinal movement between the body of the stator and the electromagnetic elements.

According to another aspect of the present disclosure, there is provided a kit of parts for an electrical machine according to the first aspect of the present disclosure, the kit of parts comprising the stator for attachment to the drivetrain component, and the rotor for attachment to the driveshaft.

According to another aspect of the present disclosure, there is provided a method of manufacturing a radial flux electrical machine, the method comprising the steps of providing the stator body, for each electromagnetic element: locating an electrically conductive winding around a stator core to form a completed electromagnetic element, inserting the electromagnetic element into the inner volume of the body of the stator such that the engagement features of the electromagnetic element engage with those of the body of the stator, and connecting the electrically conductive winding to control circuitry of the machine.

Embodiments of the present disclosure provide a radial flux rotor in which the electromagnetic elements are provided separately from the body of the stator. As a result, the electromagnetic elements may be easily removed, repaired and/or replaced as necessary. Windings may be wound around the stator cores more easily and effectively than if the stator cores were permanently connected to the body of the stator.

The body of the stator preferably comprises a plurality of engagement features for providing releasable engagement to the electromagnetic elements. Each engagement feature of the body of the stator may be arranged in use to provide releasable engagement to an individual electromagnetic element. The body of the stator may however provide a plurality of engagement features for providing releasable engagement to an individual electromagnetic element.

The body of the stator preferably provides a plurality of engagement features located on the cylindrical inner surface of the ring. The engagement features are preferably spaced apart from each other along the inner surface of the ring. The engagement features are preferably arranged to be spaced equidistant from each other along the inner surface of the ring. The engagement features of the body of the stator are preferably aligned along the inner surface of the ring so as to be provided within the same plane as each other.

The engagement features are preferably arranged so that once releasably engaged to the stator flux plate, the electromagnetic elements are placed adjacent to and spaced apart from each other by a pre-determined distance.

Each electromagnetic element preferably provides at least one engagement feature for releasable engagement with the corresponding complimentary engagement feature(s) of the body of the stator. Each electromagnetic element preferably provides a plurality of engagement features for releasable engagement with the corresponding complimentary engagement features of the body of the stator.

The first end of each electromagnetic element preferably provides one or more engagement feature(s) for releasable engagement with one or more complimentary engagement feature provided by the body of the stator. The engagement feature(s) are preferably provided in a central location on the first end of the stator core.

The engagement features may be any suitable features for providing releasable engagement between the body of the stator and the electromagnetic elements. For example, the engagement features may be selected from one or more of a recess, a channel, a groove, an opening, a protrusion or a ridge, or any combination thereof.

The engagement features preferably secure the stator cores to the body of the stator sufficiently to resist rotational forces produced by the electrical machine.

The body of the stator preferably comprises an upper surface and a lower surface. The inner surface preferably extends between the upper and lower surfaces of the body of the stator. The inner surface of the body of the stator preferably provides one or more channel as the engagement feature(s). The channel(s) is preferably shaped and dimensioned to receive and releasably engage a complimentary engagement feature of the corresponding electromagnetic element. The channel(s) may extend radially outwardly from the inner surface of the body of the stator. The channel(s) may extend from or adjacent the upper surface towards the lower surface in a direction extending substantially perpendicular to the upper surface of the body of the stator. The channel may have any suitable shape and dimensions for engaging a complimentary shaped and dimensioned engagement feature of the electromagnetic element. Preferably, the channel has a T-shaped transverse cross-section. The transverse cross-section is intended to refer to the cross-section extending within the plane defined by the body of the stator.

The inner surface of the stator flux plate may comprise a plurality of engagement features for releasable engagement to an individual electromagnetic element which are spaced apart from each other in a direction extending from the upper surface towards the lower surface of the body of the stator.

The electromagnetic element may be provided as a single unit. The electromagnetic element may be provided by a plurality of electromagnetic portions which are aligned in use to provide the electromagnetic element.

Preferably, the cross-sectional dimensions, when measured in the transverse plane, of the first and/or second ends of the electromagnetic element(s) are greater than the transverse cross-sectional dimensions of the body portion of the electromagnetic element. As a result, each electromagnetic element provides a recess on each side of the body portion between the first and second ends which is shaped and dimensioned to receive multiple wire windings.

The transverse cross-sectional dimension of the first end of the electromagnetic element is preferably greater than the transverse cross-sectional dimension of the second end of the stator core.

The first end of the electromagnetic element may have any suitable shape. Preferably, the first end is shaped to compliment the inner surface of the stator flux rotor. The first end of the electromagnetic element may be substantially planar. The second end of the electromagnetic element may have any suitable shape. Preferably, the second end comprises an arcuate portion. For example, when the electromagnetic elements are releasably engaged to the body of the stator, the second end of the electromagnetic elements provide a discontinuous cylindrical inner surface arranged to be located adjacent the cylindrical outer surface of the rotor flux plate.

The inner surface of the body of the stator may be multi-faceted. Each face may be provided by a substantially planar portion. The cylindrical inner surface of the stator flux rotor may for example be provided by a plurality of adjoining planar portions. Each planar portion may provide one or more engagement feature for releasable engagement with the complimentary engagement feature provided by the first end of an electromagnetic element.

The dimensions of the first end of the electromagnetic element, as measured between opposing free edges, may correspond to the dimensions of the corresponding portion of the inner surface of the stator flux plate, for example planar portion, to which the stator core is to be releasably engaged.

The electromagnetic elements may be composed of any suitable material. Preferably, the electromagnetic elements are composed of laminated steel. By using laminated steel plates, eddy currents and iron losses are minimized. Furthermore, laminated steel provides the required strength in order to resist the rotational forces exerted on the second end of the stator cores.

The rotor preferably comprises a rotor opening shaped and dimensioned to receive a shaft of a rotor. The rotor opening for the shaft of the rotor is preferably provided in a substantially central location on the rotor.

The rotor preferably comprises a plurality of spaced apart openings for receiving permanent magnets. The openings are preferably spaced equidistance from each other on the rotor. For example, the rotor may comprise a plurality of spaced apart arms, in which one or more openings for the permanent magnets may be provided between adjacent pairs of spaced apart arms. The arms are preferably arranged to retain the permanent magnets in position within the corresponding openings of the rotor during use. In particular, the arms are preferably arranged to provide resistance to the rotational forces.

One or more, for example each, opening may extend in a radial direction from a region adjacent the rotor opening towards the outer cylindrical surface of the rotor. One or more, for example each, of the openings for the permanent magnets is preferably elongate in shape. The longitudinal axis of the or each opening for the permanent magnet(s) preferably extends in a substantially radial direction.

The permanent magnets are received within the openings of the rotor. In use, the permanent magnets are rotated in close proximity to and within the opening defined by the second ends of the electromagnetic elements. The magnetic flux field produced across the air gap between the permanent magnets and the second ends of the stator cores extends in a radial direction.

Each of the electromagnetic elements may further comprise wire windings extending around the body portion and located within the recesses provided between the first and second ends of the stator core.

The electrical machine may further comprises an enclosure shaped and dimensioned to abut against the upper and lower surfaces of the body of the stator.

The electrical machine preferably further comprises a locating component for accurately determining the position of a PCB (printed circuit board) relative to the rotor and an encoder magnet. The locating component is preferably located adjacent the lower surface of the rotor. The locating component preferably comprises a first portion for receiving an encoder magnet, in which the first portion is attachable to and rotatable with the lower surface of the rotor. The locating portion preferably comprises a second portion for receiving the encoder PCB (printed circuit board), in which the second portion is not rotatable with the rotor.

The term “electrical machine” is herein used to refer to a motor, a generator, a motor/generator unit, or other type of electrical machine.

DETAILED DESCRIPTION OF AN EMBODIMENT OF THE DISCLOSURE

Figure 1:
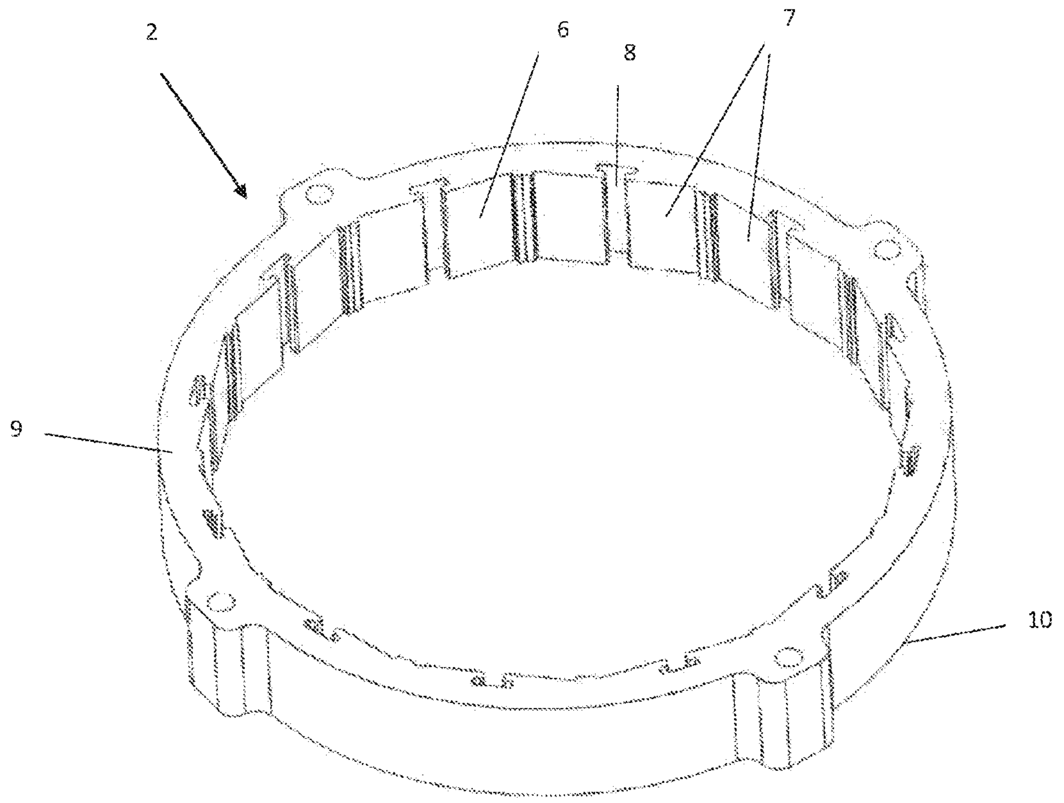
FIG. 1 illustrates a perspective view of the body of a stator of an electrical machine.

With reference to the FIGS. 1 to 3 and 5 to 7, an electrical machine 1 comprises stator having a body 2, a plurality of electromagnetic elements 3, and a rotor 4 including a plurality of permanent magnets 5.

The body of the stator 2 is substantially circular in cross section and defines a substantially cylindrical inner surface 6. The inner surface 6 may be multi-faceted, as shown, or may be any other suitable shape. The body 2 defines a longitudinal axis and an inner volume.

In the example of FIG. 1, the inner surface 6 has twelve adjoining planar portions 7 which provide the inner surface 6. It is, however, to be understood that the inner surface 6 may comprise any suitable number of planar portions depending on the requirements of the electrical machine.

Each planar portion 7 provides a centrally located channel 8 as an engagement feature. The body of the stator 2 therefore provides twelve spaced apart channels 8. The channels provide releasable engagement for respective electromagnetic elements 3, as will be described in more detail below. As shown in FIG. 1, the channels 8 are spaced equidistance from each other, although any suitable spacing pattern may be used.

Although the figures illustrate the body of the stator 2 as providing channels to provide releasable engagement to the electromagnetic elements 3 it is to be understood that the body of the stator 2 may provide any suitable arrangement and number of engagement features or combination of engagement features.

For example, one or more of the planar portions, for example each planar portion, may provide two or more engagement features. Each planar portion may provide the same number of engagement features as the other planar portions. The planar portions may comprise different numbers of engagement features depending on the requirements of the electrical machine. The inner surface 6, for example the planar portions 7, may provide the engagement features in any suitable location. It is to be understood that the number of engagement features provided by the inner surface 6, for example by each planar portion, and the location of the engagement feature(s) may vary depending on the requirements of the electrical machine.

As shown in FIG. 1, each channel 8 extends from an upper surface 9 of the body 2 towards a lower surface 10 thereof. Each channel 8 extends in a direction extending substantially perpendicular to the upper surface 9 of the body 2. In the example, each channel 8 has a T-shaped transverse cross-section. It is, however, to be understood that the body 2 may provide channels having any suitable cross-sectional shape and dimensions for providing releasable engagement for the electromagnetic elements 3.

Figure 2:
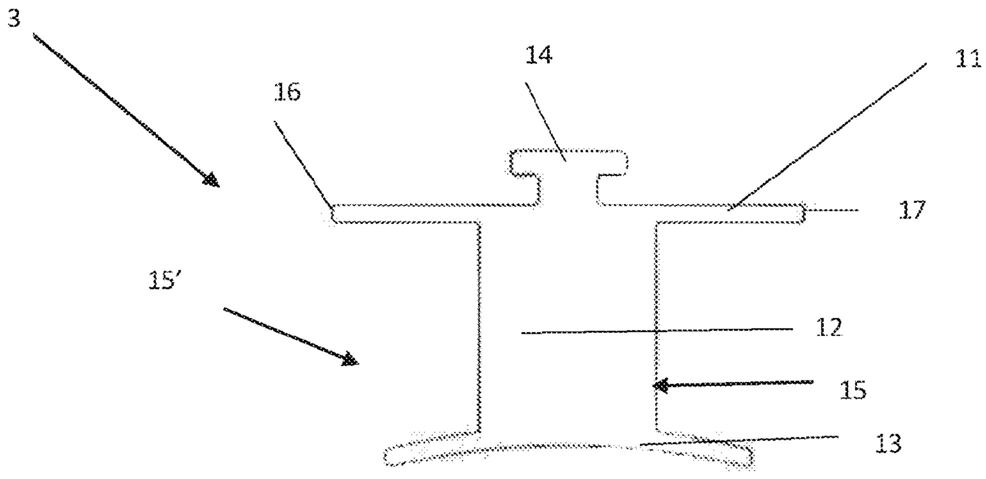
FIG. 2 illustrates a view from above of an electromagnetic element of an electrical machine.
Figure 3:
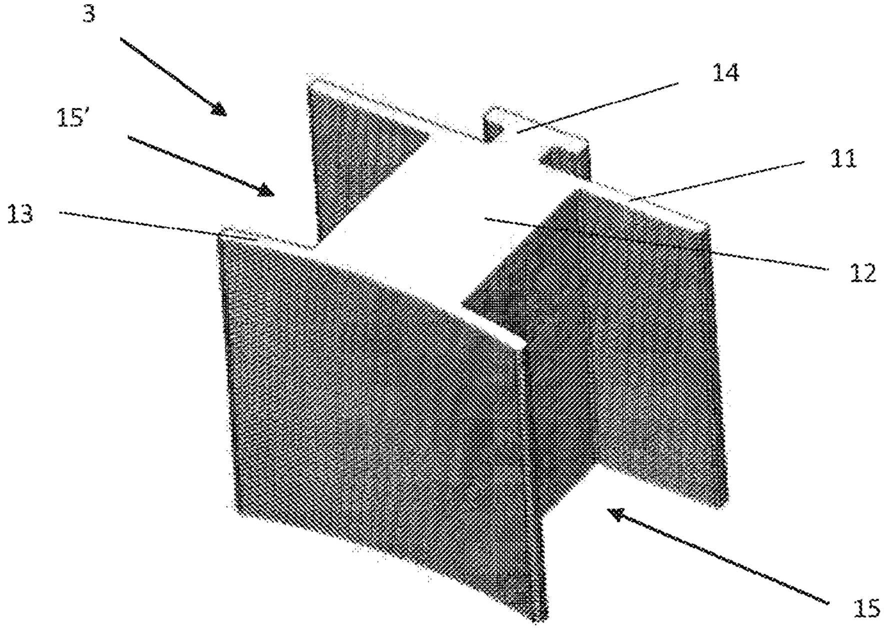
FIG. 3 illustrates a perspective view of the electromagnetic element of FIG. 2.

In the example, the electrical machine 1 comprises twelve electromagnetic elements 3. As shown in FIGS. 2 and 3, each electromagnetic element 3 comprises a stator core having a first end 11, a body portion 12, and an opposed second end 13. The first end 11 of each stator core is arranged in use to be in contact with the inner surface 6 of the body 2.

The first end 11 is substantially planar and is shaped and dimensioned to compliment and to be aligned with the corresponding planar portion 7 of the body of the stator 2. The dimensions of the first end 11 of the electromagnetic element 3, as measured between opposing free edges 16,17, may correspond to the dimensions of the corresponding planar portion 7 of the inner surface 6 of the stator flux plate 2 to which the stator core 3 is to be releasably engaged. It is however to be understood that the first end 11 may have any suitable shape and dimensions to be aligned with the corresponding portion of the inner surface 6 of the body of the stator.

The second end 13 is arcuate in shape such that when the electromagnetic elements 3 are releasably engaged to the body of the stator 2, the second end 13 of the electromagnetic elements 3 provide a discontinuous cylindrical inner surface 17.

The first end 11 of each electromagnetic element 3 provides a centrally located protrusion or key 14 having a T-shaped transverse cross-section. The protrusion or key 14 is shaped and dimensioned to be received within the channel 8 of the body of the stator 2. It is to be understood that each electromagnetic element 3 may provide any suitable engagement feature for providing releasable engagement to the body of the stator 2. Furthermore, it is to be understood that each electromagnetic element 3 may provide any suitable number of engagement features in any suitable location for providing releasable engagement to the body of the stator 2. The number and location of engagement features may vary between each electromagnetic element.

The cross-sectional dimensions, when measured in the transverse plane, of the first 11 and second ends 13 of the electromagnetic element 3 are greater than the transverse cross-sectional dimensions of the body portion 12 of the electromagnetic element 3. As a result, each electromagnetic element 3 provides a recess 15, 15' on each side of the body portion 12 between the first 11 and second 13 ends which is shaped and dimensioned to receive multiple wire windings.

The transverse cross-sectional dimension of the first end 11 of the electromagnetic element 3 is greater than the transverse cross-sectional dimension of the second end 13 of the stator core. It is however to be understood that the cross-sectional dimensions of the first end 11 and second end 13 of the stator core may vary depending on the requirements of the electrical machine.

The electromagnetic elements 3 may be composed of any suitable material. The electromagnetic element 3 illustrated in FIG. 3 is composed of laminated steel.

Figure 6:
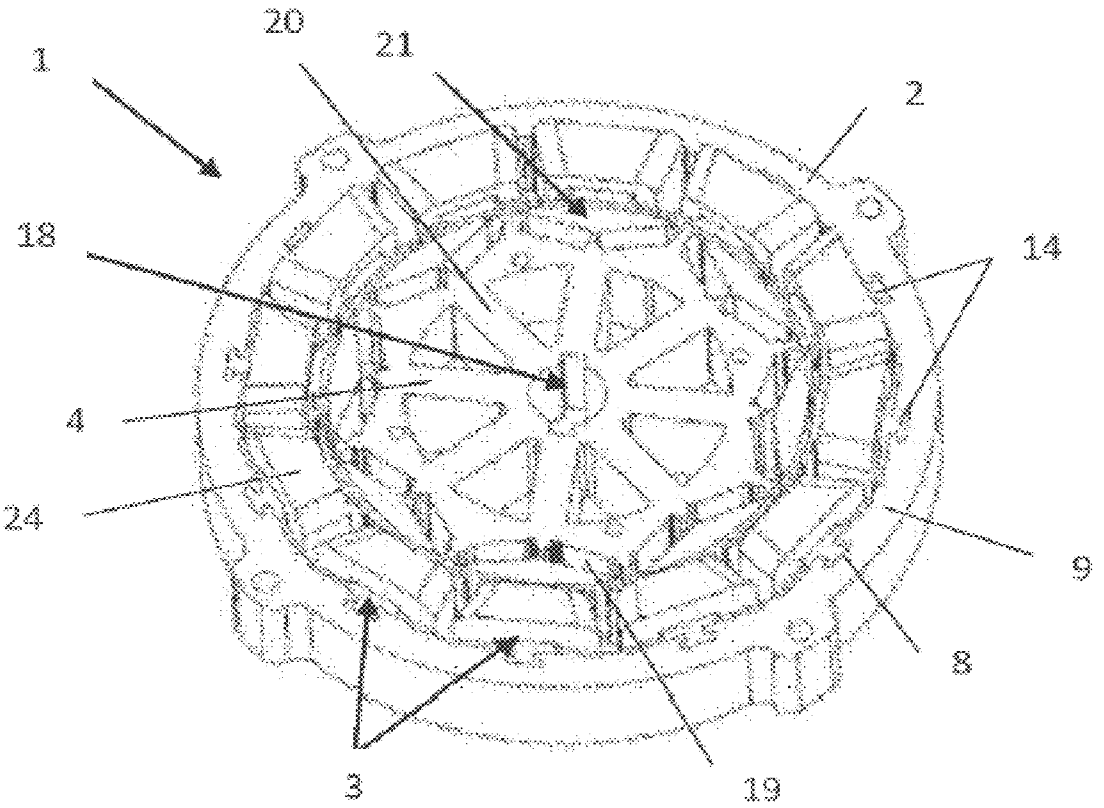
FIG. 6 illustrates a perspective view of an electrical machine comprising the body of the stator of FIG. 1 together with the electromagnetic elements of FIG. 2 and the rotor of FIG. 5.

As shown in FIG. 6, each of the electromagnetic elements 3 further comprise electrically conductive windings 24 extending around the body portion 12 and located within the recesses 15, 15' provided between the first 11 and second ends 13 of the stator core.

In one preferred example, each electromagnetic element 3 is provided as a single component having the stator core and winding.

Figure 4:
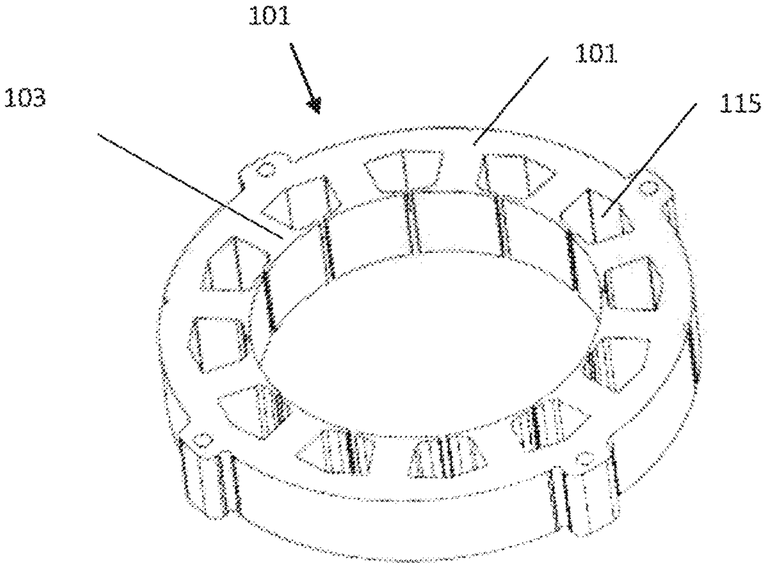
FIG. 4 illustrates a perspective view of a single piece stator comprising a stator body and a plurality of integral electromagnetic elements.

One example of a single piece stator is shown in FIG. 4. The stator comprises a stator body 102 comprising a plurality of spaced apart integral electromagnetic elements 103 extending therefrom. Recesses 115 are provided between adjacent pairs of electromagnetic elements 103 to receive electrically conductive windings (not shown).

In accordance with an aspect of the present disclosure, the stator assembly described above used in an electrical machine adapted to be bolted directly to another drivetrain component, such as a gearbox. The other drivetrain component thereby forms part of the housing of the electrical machine.

In addition, as will described below, the rotor of such a machine is attached directly to the driveshaft of that gearbox (or other drivetrain component), such that the rotor is carried by the bearings of the gearbox. This removes the need for bearings within the electrical machine itself, which contributes to simplified manufacture and repair.

Figure 5:
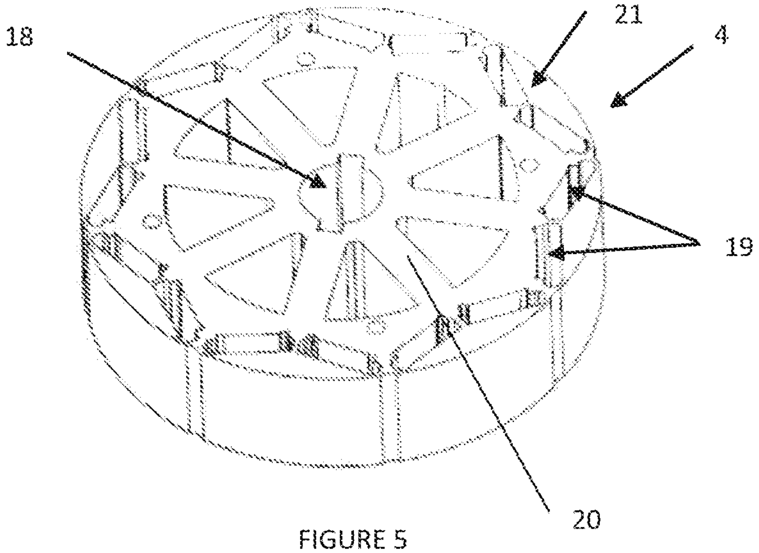
FIG. 5 illustrates a perspective view of a rotor.
Figure 7:
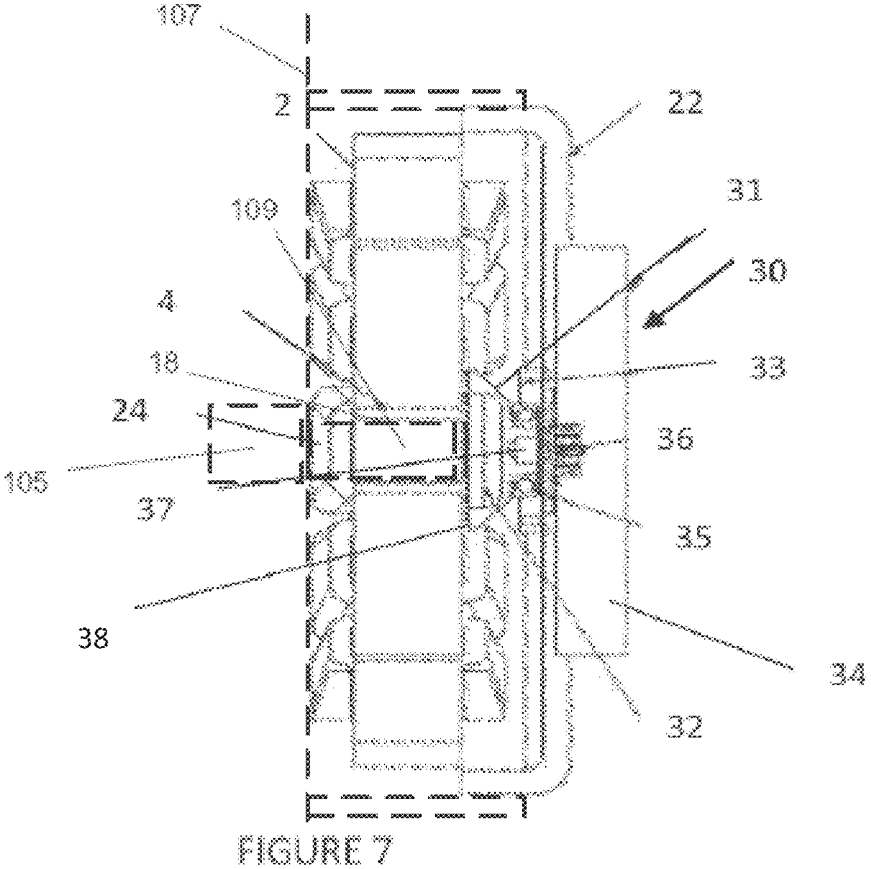
FIG. 7 illustrates a cross-sectional view of the electrical machine of FIG. 6 with a position encoder.
Figure 8:
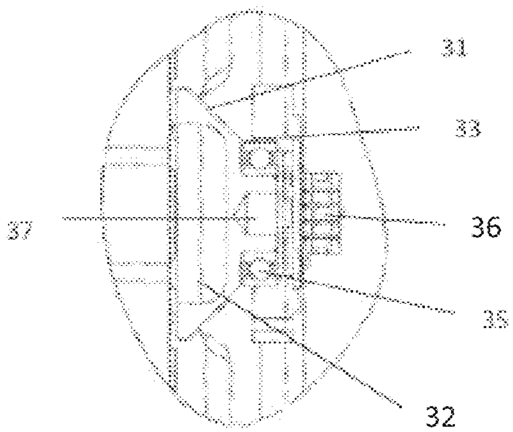
FIG. 8 illustrates a close up of the cross-sectional view of the electrical machine of FIG. 7.
Figure 9:
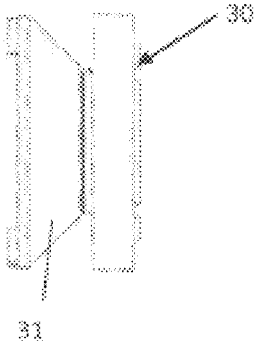
FIG. 9 illustrates a side view of the position encoder of FIG. 7.
Figure 10:
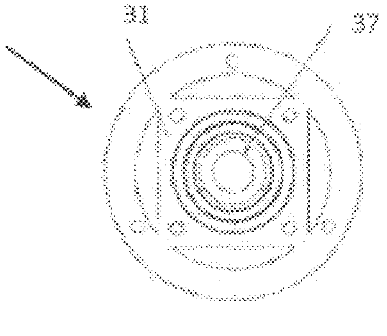
FIG. 10 illustrates a view from above of the position encoder of FIG. 7.
Figure 11:
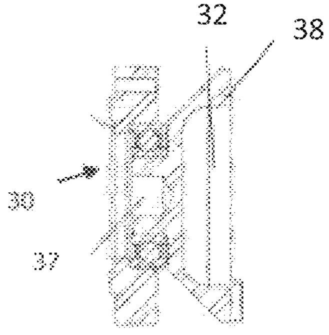
FIG. 11 illustrates a cross-sectional view of the position encoder of FIG. 7.

As shown in FIGS. 5 to 7, the rotor 4 comprises a shaft opening 18 shaped and dimensioned to receive a shaft (not shown). The shaft opening 18 is provided in a substantially central location of the rotor 4. The rotor 4 is arranged in use to be positioned within and aligned with the body 2 of the stator, for relative rotation with respect to the stator (as shown in FIG. 6).

In this example, the rotor 4 comprises sixteen spaced apart openings 19 shaped and dimensioned to receive permanent magnets (not shown). The openings 19 are spaced apart from each other around the rotor 4. The spaced apart openings 19 may have any suitable shape. In this example, the openings 19 are elongate in shape. The longitudinal axis of each opening 19 extends at an angle to the radial axis of the rotor 4. The rotor 4 provides twice as many openings 19 for magnets as there are electromagnetic elements 3. The openings 19 may be provided in any suitable location. In this example, the openings 19 are in an outer edge region 21 of the rotor 4. It is to be understood that the number, shape, dimensions and arrangement of the openings 19 may vary depending on the requirements of the electrical machine.

The rotor 4 also provides a plurality of spaced apart arms 20. The rotor illustrated in FIG. 6 has eight spaced apart arms 20. It is to be understood that the rotor 4 may comprise any suitable number of openings 19 and arms 20.

As shown in FIG. 7, an electrical machine embodying an aspect of the present disclosure includes an enclosure 22 which abuts a surface of the body of the stator 2. The enclosure 22 substantially encloses the body of the stator 2 and the electromagnetic elements 3. In an embodiment of the present disclosure, an enclosure is provided to only one side of the stator 2. In such an embodiment, the stator 2 is arranged to be directly attached (for example by bolts) to a gearbox, or other drivetrain component. The rotor 4 is adapted to be directly attached to a driveshaft of the drivetrain component. Such an arrangement removes the need for the electrical machine to be provided with bearings on the stator for the rotor.

The drivetrain component housing 107 has a driveshaft 109 that extends therefrom. The driveshaft is supported only by one or more bearings 105 contained in the drivetrain component itself, and not by bearings in the stator housing or enclosure. In such a manner, the rotor 4, when attached to the driveshaft 109 is supported in a cantilevered fashion by only the bearings of the drivetrain component. FIG. 7 depicts of the stator body 2 with respect to the housing 107 and the positioning driveshaft 109 with respect to the rotor 4 using arrows. This design removes the need for additional bearings in the stator housing and enclosure, which contributes to more straightforward manufacturing and maintenance of the electrical machine. The lack of bearings in the machine itself also reduces manufacturing tolerances.

In addition, such a design enables an electric drive motor to be attached directly to a driveshaft of a drivetrain of the equipment to be driven. For example, such an arrangement allows the efficient mounting and maintenance of a drive motor for an electric vehicle such as a golf cart, or for a pump or any other equipment that requires an electrical drive motor. The lack of motor bearings reduces the number of components that wear, and aids straightforward replacement of the rotor and other drive motor components.

As illustrated in FIGS. 7 to 11, the electrical machine 1 further comprises a locating component 30. The locating component 30 attaches to an end surface of the rotor 4. The locating component 30 comprises a first portion 31 which attaches to the end surface of the rotor 4 and is rotatable with the rotor 4. In the embodiment shown in the Figures, the first portion 31 is substantially cone shaped. The locating component 30 is substantially centrally located on the rotor 4. An encoder magnet (not shown) is located within an encoder magnet holder 32 located adjacent a first end 38 of the first portion 31 of the locating component. The encoder magnet is therefore rotatable with the rotor 4.

The locating portion 30 further comprises a second portion 33 for holding an encoder PCB (printed circuit board) 36. The encoder PCB carries encoder circuitry operable to provide encoded signals relating to the speed and position of the rotor 4. These signals are derived from an output of a magnetic sensor 37 which is closely magnetically coupled with the magnet.

The encoder PCB can also carry at least one touch-free temperature sensor for measuring the temperature of the rotor and/or the windings of the stator.

The second portion 33 is attached to a controller housing 34 located on the enclosure 22. The second portion 33 is not rotatable with the rotor 4. A bearing 35 is provided between the first and second portions 31, 33 of the locating portion. The electrical machine 1 of the present disclosure provides a reliable way to locate accurately the PCB with respect to the encoder magnet and rotor 4 while enabling the locating component to be easily manufactured and repaired.

The controller housing 34 houses control circuitry for the electrical machine, and includes circuitry for interfacing with the encoder circuitry on the PCB 36. The control circuitry is also able to interface with various control sensors, such as infra-red temperature sensors, and is operable to provide control signals for control of the electrical machine.

In use, the rotor 4 is rotatable in close proximity to the second ends 13 of the electromagnetic elements 3 within the inner volume of the stator.

When operated as an electric motor, electrical current is supplied to the windings of the electromagnetic elements 3, so as to induce a magnetic flux field across the air gap between the permanent magnets received within the openings 19 and the second ends 13 of the stator cores 3. The magnetic flux field extends in a radial direction within the inner volume of the stator between the electromagnetic elements 3 and the rotor 4.

The electrical current is controlled in order to create a varying magnetic flux field so that an electromagnetic force is induced in the permanent magnets of the rotor, thereby causing the rotor to rotate with respect to the stator, in accordance with known principles of operation of electric motors.

When operated as a generator, the rotor 4 is caused to rotate with respect to the electromagnetic elements 3, such that rotation of the permanent magnets past the windings, causes electrical current to flow in the windings, thereby generating electrical power. Once again, an electrical machine embodying the present disclosure is operated in accordance with known principles.

A radial flux electrical machine according to an embodiment of the present disclosure is able to be manufactured and repaired in a more straightforward manner than previous designs. In accordance with another aspect of the present disclosure, a method of manufacturing such an electrical machine includes initially providing the stator body. For each electromagnetic element 3, an electrically conductive winding is located around a stator core to form a completed electromagnetic element. An optional additional step would be to encapsulate the element, for example in a plastics material.

Each electromagnetic element 3 is then inserted into the inner volume of the body 2 such that the engagement features of the electromagnetic element engage with those of the body of the stator. In such a manner, the completed electromagnetic elements 3 can be inserted (and removed) easily and quickly into the stator body 2.

The windings of the electromagnetic elements 3 are then connected to the control circuitry of the electrical machine.

Although aspects of the disclosure have been described with reference to the embodiment shown in the accompanying drawings, it is to be understood that the disclosure is not limited to the precise embodiment shown and that various changes and modifications may be effected without further inventive skill and effort.

The invention claimed is:

1. A radial flux electric machine comprising:
- a rotor comprising:
  - a bore for receiving a shaft, the bore forming a through passage between a first axial face of the rotor and a second axial face of the rotor;
  - a hub surrounding the bore circumferentially around a central axis of the bore;
  - a plurality of arms spaced apart and extending from the circumference of the hub;
  - gaps formed between the arms, the gaps forming through passages between the first axial face of the rotor and the second axial face of the rotor;
  - slots arranged circumferentially around the radially outer side of the arms, the slots extending axially into the rotor, and permanent magnets positioned within the slots such that the permanent magnets are arranged circumferentially around the central axis of the bore;
- a stator having an outer circumference extending circumferentially around the rotor and the central axis of the bore, the stator comprising:
  - electromagnetic elements each with a body portion extending radially inward from the outer circumference of the stator, wherein adjacent electromagnetic elements define a recess between the electromagnetic elements, the recess receiving windings, and the windings are arranged circumferentially around the central axis of the bore, interior to the outer circumference of the stator, and exterior to the permanent magnets; and an encoder and printed circuit board (PCB) positioned along one of the axial faces of the rotor, the encoder sensing a rotation of the rotor via one or more magnets coupled to the rotor.

2. The radial flux electric machine of claim 1, wherein the recess is shaped as a pentagon.

3. The radial flux electric machine of claim 2, wherein a vertex of the pentagon is located at a midpoint between the adjacent electromagnetic elements.

4. The radial flux electric machine of claim 1, wherein the electromagnetic elements comprise an engagement feature which connects to the circumference of the stator.

5. The radial flux electric machine of claim 1, wherein the electromagnetic elements comprise a portion which extends outward bidirectionally from the body portion.

6. The radial flux electric machine of claim 5, wherein the portion which extends outward bidirectionally from the body portion comprises a radially inward boundary of the recess.

7. The radial flux electric machine of claim 5, wherein the portion which extends outward bidirectionally from the body of the electromagnetic element is positioned radially inward of the winding.

8. The radial flux electric machine of claim 1, wherein the hub comprises an outer edge region, and wherein the slots are arranged in the outer edge region.

9. The radial flux electric machine of claim 8, wherein the arms extend radially inward from the outer edge region.

10. A radial flux electric machine comprising:

a rotor comprising:

a bore forming a through passage between a first axial face of the rotor and a second axial face of the rotor;

an outer edge region surrounding the bore circumferentially around the bore, the outer edge region comprising slots extending axially into the rotor, wherein permanent magnets are positioned within the slots such that the permanent magnets are arranged circumferentially around the bore; and arms extending radially inward from the outer edge region towards the bore and gaps formed between the arms;

a stator having an outer circumference extending circumferentially around the rotor and the bore, the stator comprising:

electromagnetic elements comprising a body portion extending radially inward from the outer circumference of the stator, the body receiving windings, and the windings are arranged circumferentially around the bore, interior to the outer circumference of the stator, and exterior to the permanent magnets;

an encoder and printed circuit board (PCB) positioned along one of the axial faces of the rotor, the encoder sensing a rotation of the rotor via one or more magnets coupled to the rotor, wherein the PCB is attached to a controller housing located external to a stator enclosure.

11. The radial flux electric machine of claim 10, wherein the PCB is attached to the stator enclosure and the stator enclosure extends along one of the axial faces of the rotor.

12. The radial flux electric machine of claim 10, wherein the rotor is supported by a shaft which extends into the stator body from a drivetrain component exterior to a longitudinal side of the stator.

13. The radial flux electric machine of claim 10, wherein the encoder comprises a first portion attached to the stator enclosure and a second portion attached between the first portion and the rotor, the second portion of the encoder rotatable with the rotor, and a magnetic sensor attached to a rotor side of the first portion.

14. The radial flux electric machine of claim 10, wherein passages extend between a first axial side of the rotor and a second axial side of the rotor.

15. A electric machine comprising:

a rotor comprising:

a bore for receiving a shaft of a drivetrain component, the bore forming a through passage between a first axial face of the rotor and a second axial face of the rotor;

a region surrounding the bore circumferentially around a central axis of the bore;

arms extending radially from the region and gaps formed between the arms;

slots arranged circumferentially around the radially outer side of the arms, the slots extending axially into the rotor, and permanent magnets positioned within the slots such that the permanent magnets are arranged circumferentially around the central axis of the bore;

a stator having an outer circumference extending circumferentially around the rotor and the central axis of the bore, the stator comprising:

electromagnetic elements each with a body portion extending radially inward from the outer circumference of the stator and ends extending circumferentially from a side of the body portion located closer to the central axis of the bore, the electromagnetic elements receiving windings, the windings arranged circumferentially around the bore, interior to the outer circumference of the stator, and exterior to the permanent magnets;

an encoder and printed circuit board (PCB) positioned along one of the axial faces of the rotor opposite the drivetrain component, the PCB attached to a controller housing, the controller housing being external to a stator enclosure, and the encoder sensing a rotation of the rotor via one or more magnets coupled to the rotor.

16. The electric machine of claim 15, wherein a recess between adjacent electromagnetic elements is substantially pentagon-shaped.

17. The electric machine of claim 16, wherein an apex of the recess is located on the stator at a midpoint between adjacent electromagnetic elements, and wherein the apex aligns with a gap between the ends of adjacent electromagnetic elements.

18. The electric machine of claim 15, wherein passages extend between a first axial side of the rotor and a second axial side of the rotor.

19. The electric machine of claim 15, wherein the rotor is supported by a shaft which extends into the stator body from a drivetrain component exterior to a longitudinal side of the stator.

20. The electric machine of claim 15, wherein the electromagnetic elements comprise an engagement feature which connects to the circumference of the stator.

* * * * *